United States Patent [19]

Shimizu

[11] 4,072,022
[45] Feb. 7, 1978

[54] APPARATUS FOR PROTECTING BRIDGE PILLARS

[75] Inventor: Soichiro Shimizu, Tokyo, Japan

[73] Assignee: Tokyo Fabric Kogyo Kabushiki Kaisha, Tokyo, Japan

[21] Appl. No.: 731,685

[22] Filed: Oct. 12, 1976

[30] Foreign Application Priority Data

Nov. 25, 1975 Japan ............................ 50-158446[U]
Oct. 11, 1975 Japan ................................. 50-122776

[51] Int. Cl.² ............................................. E02B 3/22
[52] U.S. Cl. ............................................ 61/48; 61/54; 114/219
[58] Field of Search .................... 61/48, 54; 114/219, 114/220; 256/1, 13.1

[56] References Cited

U.S. PATENT DOCUMENTS

| | | | |
|---|---|---|---|
| 992,776 | 5/1911 | Hubbard | 61/54 X |
| 1,095,919 | 5/1914 | Ontko | 114/219 |
| 1,927,446 | 9/1933 | Qualey et al. | 114/219 |
| 2,562,957 | 8/1951 | Sipkin et al. | 114/219 |
| 2,892,315 | 6/1959 | Blancato | 61/48 |
| 3,104,875 | 9/1963 | Doyle | 61/48 UX |
| 3,370,432 | 2/1968 | Butler et al. | 61/54 |
| 3,541,800 | 11/1970 | Walker et al. | 61/48 |
| 3,584,464 | 6/1971 | Saadeh | 61/48 |

FOREIGN PATENT DOCUMENTS

725,965 10/1942 Germany ....................... 61/48

*Primary Examiner*—Dennis L. Taylor
*Attorney, Agent, or Firm*—Armstrong, Nikaido & Marmelstein

[57] ABSTRACT

An apparatus for protecting a bridge pillar which comprises a protecting cylinder adapted to be mounted outside said bridge pillar so as to surround the latter, a plurality of elastic connecting rods for interconnecting said bridge pillar and said protecting cylinder, said connecting rods being connected to said bridge pillar so that they may be pivoted in every direction; and a float mounted on or in said protecting cylinder for floating it in water, in such a manner that at least half of said protecting cylinder is immersed in water.

8 Claims, 13 Drawing Figures

APPARATUS FOR PROTECTING BRIDGE PILLARS

BACKGROUND OF THE INVENTION

This invention relates to an apparatus for preventing possible damage of bridge pillars installed in the sea for supporting a suspension bridge due to collision of vessels passing through the bridge.

For the bridge pillar protectors, there have heretofore been employed for example a protector of a type that comprises a plurality of air or sponge injection buoys connected by wires so as to be located around each pillar, and a protector of another type that comprises a plurality of elastic members which are made of rubber or the like and which are located around each bridge pillar, each of said elastic members being sandwitched between steel plates.

However, the former could not provide sufficient shock absorbing effect, whilst the latter could provide sufficient shock absorbing effect, but was disadvantageous from the point of view of cost.

SUMMARY OF THE INVENTION

It is, therefore, an object of the present invention to provide a bridge pillar protector with a sufficient shock absorbing capacity.

Another object of the present invention is to provide a bridge pillar protector which utilizes fluid resistance effectively. According to one aspect of the present invention, the invention is directed to an apparatus for protecting a bridge pillar comprising a protecting cylinder adapted to be mounted outside said bridge pillar so as to surround the latter, a plurality of elastic connecting rods for interconnecting said bridge pillar and said protecting cylinder, said connecting rods being connected to said bridge pillar and said protecting cylinder so that they may be pivoted in every direction, and means for floating said protecting cylinder in water in such a manner that at least half of said protecting cylinder is immersed in water.

In the event of collision of a vessel with the protecting cylinder, the latter serves to flow the water outside thereof as well as the water between the protecting cylinder and the bridge pillar and moves with an elastic deformation of elastic connecting rods so that it can effectively absorb the shock load caused by the collided ship by utilizing the flow resistance of water and resilient restoring forces of the elastic connecting rods. Further, the protecting cylinder can prevent possible damage of bridge pillars due to collision of vessels passing through the bridge. When the shock load imposed by the collided vessel has been released from the protecting cylinder, the latter is permitted to return automatically to the original position thereof due to the resilient restoring forces of the elastic connecting rods.

Outer and inner cushion pads are mounted outside and inside the protecting cylinder so that the former may prevent possible damage of the protecting cylinder due to collision of vessels and the latter may absorb the shock load and protect the bridge pillar when the protecting cylinder is moved to a large extent so as to contact with the bridge pillar.

According to another embodiment of the present invention, the protector comprises bridge pillars of non-circular form having intermediate sections extending in parallel, and a plurality of auxiliary connecting rods which extend obliquely and are connected to said parallel sections thereby increasing the shock absorbing capacity thereof.

DETAILED DESCRIPTION OF THE PREFERRED EMBODIMENTS

FIGS. 1 to 5 show the first embodiment of the present invention which comprises a steel protecting cylinder 2 having a circular cross section, a plurality of float chambers 1 consisting of steel pipes having closed both ends and located in contact with or adjacent to the protecting cylinder 2, said float chambers 1 being located in spaced apart relationship in the vertical direction and fixedly secured to the protecting cylinder 2 by means of flanged U-shaped metal fittings 7 and bolts. A plurality of circular retainer members 8 consisting of H-shaped steel channels are located in annular form in contact with or adjacent to the inner peripheral surface of the protecting cylinder, said retainer members 8 being located in spaced apart relationship in the vertical direction and fixedly secured to the protecting cylinder 2 by welding.

Fixedly secured by means of bolts to the inner peripheral surface of each of the retainer members 8 is a hollow inner shock absorbing member or inner cushion 6, and also disposed vertically in spaced apart relationship on the outer peripheral surface of the protecting cylinder 2 are a plurality of outer shock absorbing members or outer cushions 5 made of rubber. The outer cushions 5 are fixedly secured to the protecting cylinder 2 by means of bolts. Further, the protecting cylinder 2 provided with the float chambers 1, inner cushions 6 and the outer cushions 5 is located so as to surround a suspension bridge pillar 3 installed in the sea. A considerable large spacing is provided between the outer peripheral surface of the bridge pillar 3 and the protecting cylinder 2 and also between the latter and the inner cushions 6.

A plurality of steel anchor bands 10, each having a rubber band packing 9 adhered thereto are fitted to the bridge pillar 3 in spaced apart relationship in the vertical direction. Furthermore, a plurality of elastic connecting rods 4 capable of expansion and contraction, each having an intermediate elastic member 11 made of rubber or consisting of a helical spring are located radially around the bridge pillar 3. The inner end of each of the elastic connecting rods 4 is connected to the anchor band 10 so that it may be pivoted in every direction, whilst the outer end of each of the elastic connecting rods 4 is inserted through the protecting cylinder 2 and is secured to the latter by means of a nut 12. More than half of the protecting cylinder 2 is adapted to be immersed in the sea water.

Figure 1:
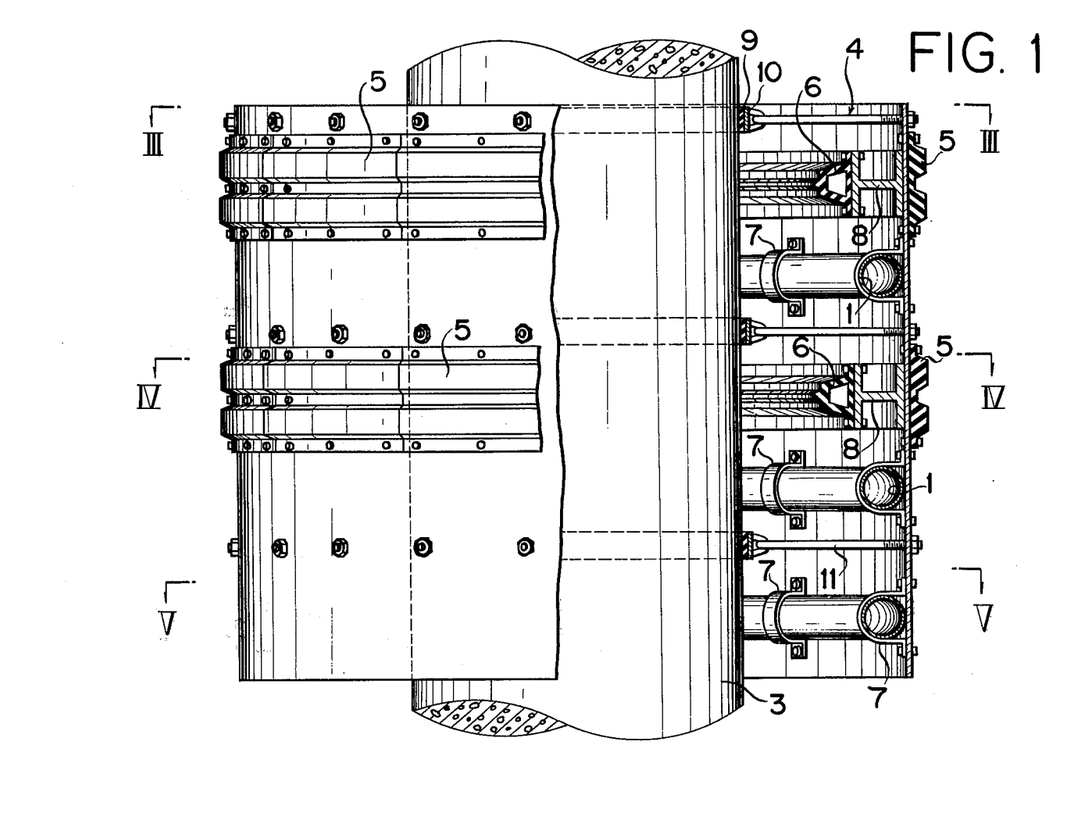
FIG. 1 is a side view of the present invention partially in cross section.
Figure 2:
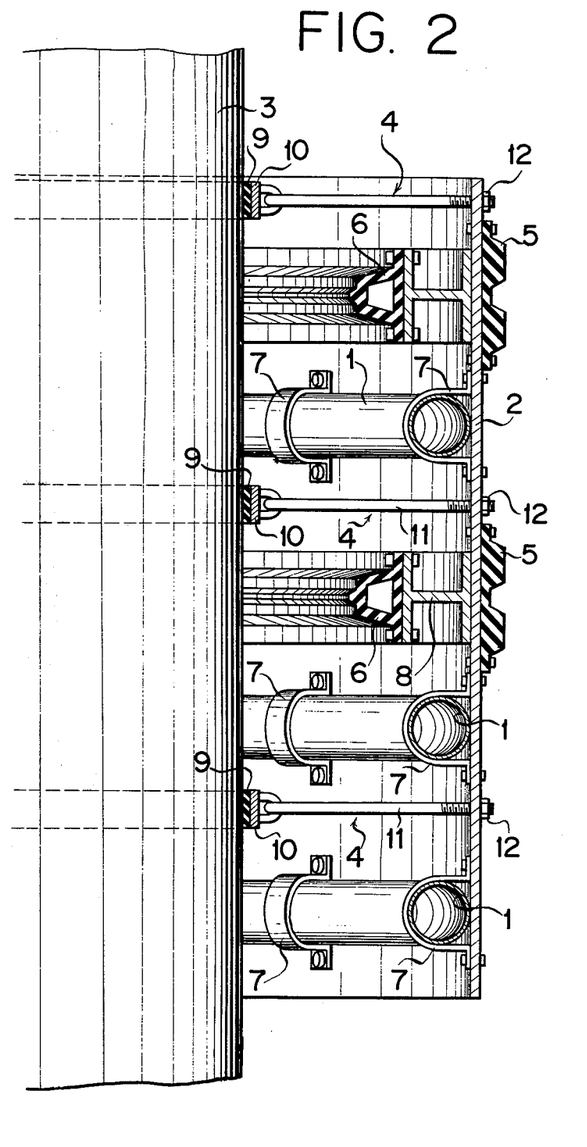
FIG. 2 is an enlarged longitudinal cross sectional view showing part of FIG. 1.
Figure 3:
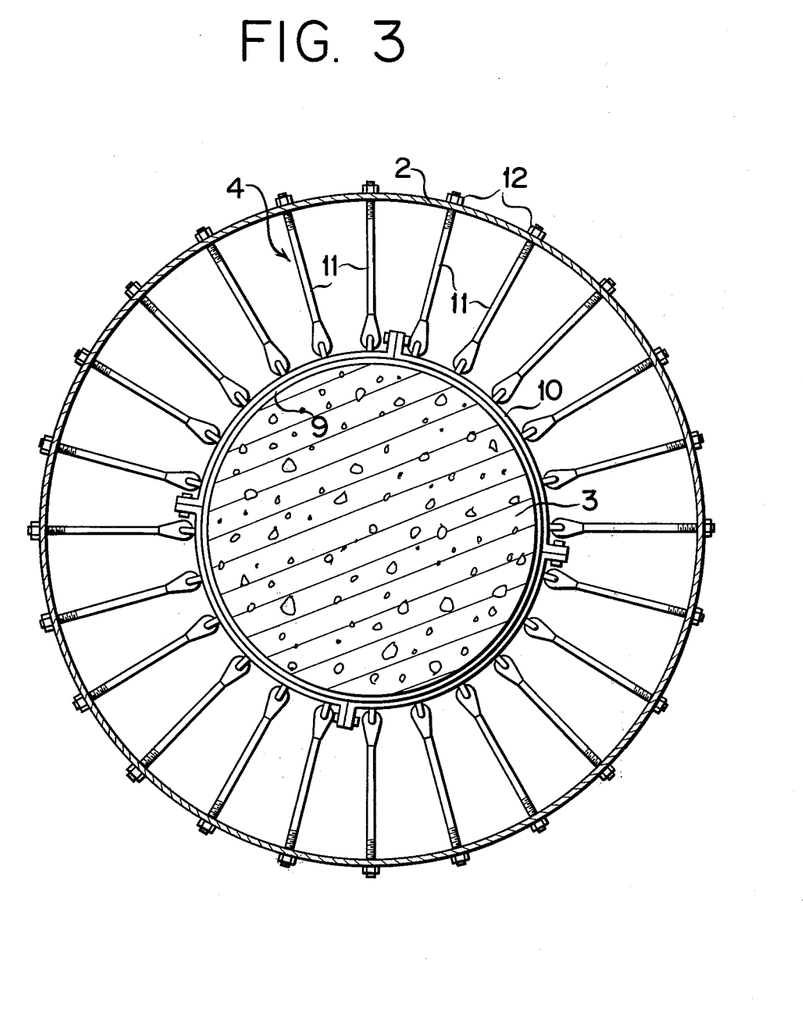
FIG. 3 is a cross sectional view of the same taken along line III—III in FIG. 1.
Figure 4:
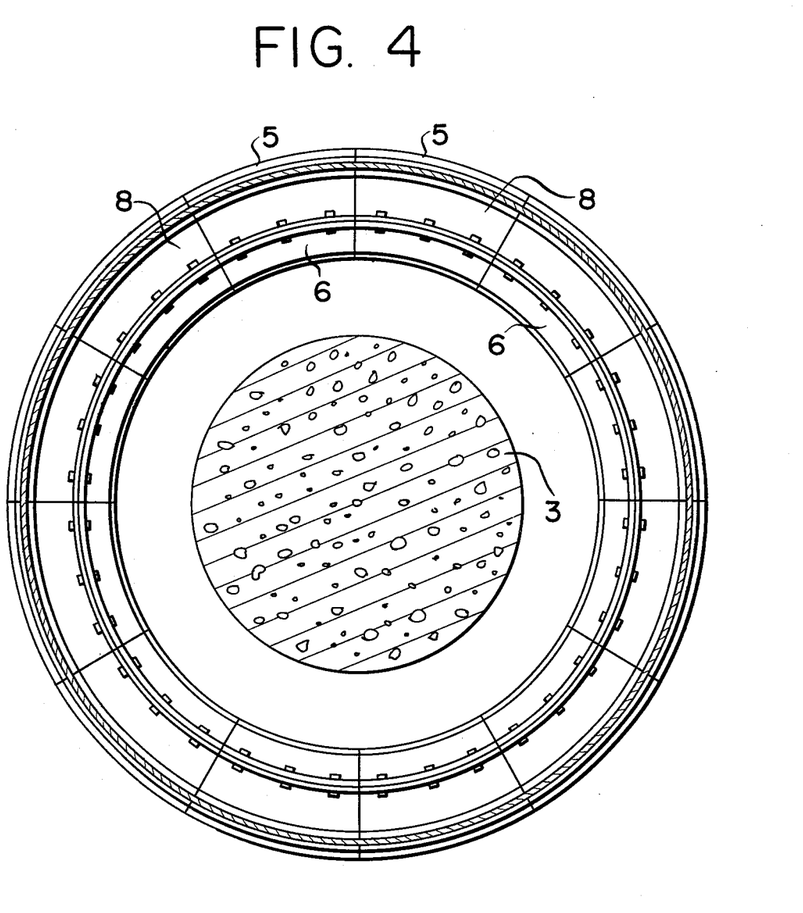
FIG. 4 is a cross sectional view of the same taken along line IV—IV in FIG. 1.
Figure 5:
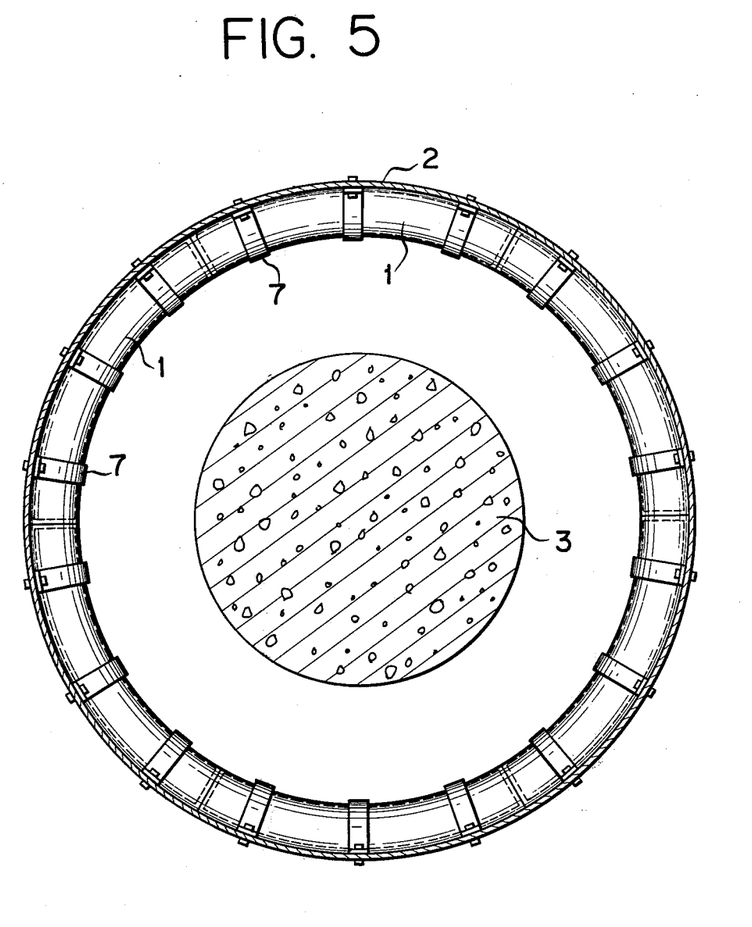
FIG. 5 is a cross sectional view of the same taken along line V—V in FIG. 1.
Figure 6:
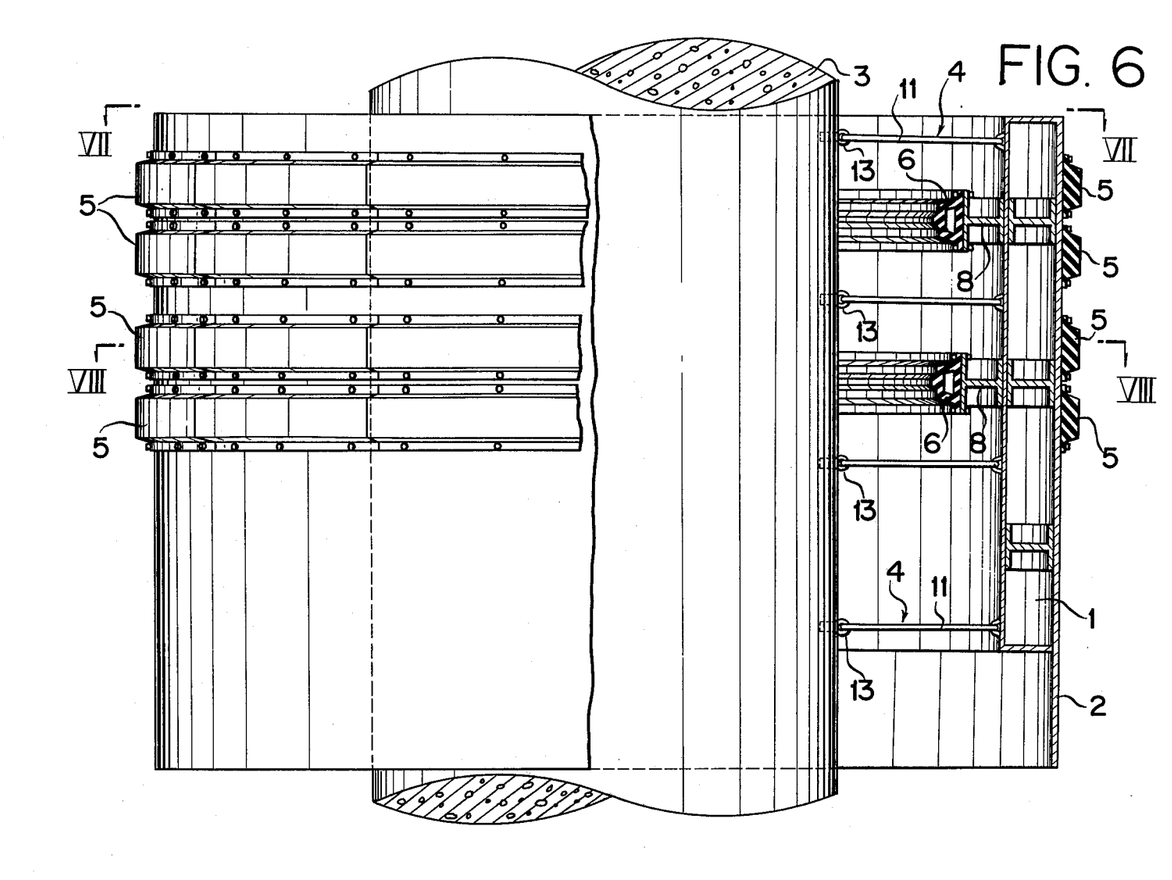
FIG. 6 is similar to FIG. 1 but showing another embodiment of the present invention.
Figure 7:
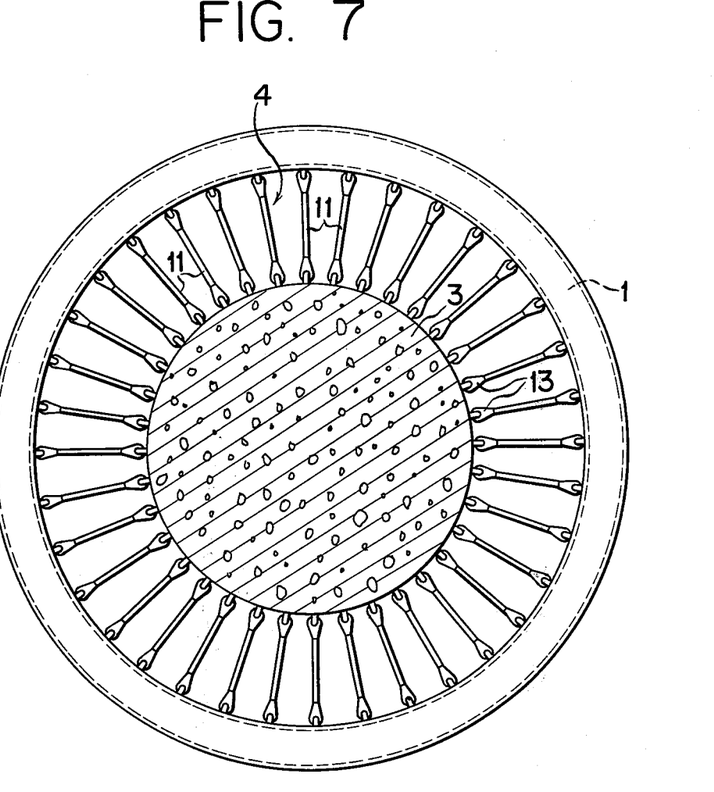
FIG. 7 is a cross sectional view of the same taken along line VII—VII in FIG. 6.
Figure 8:
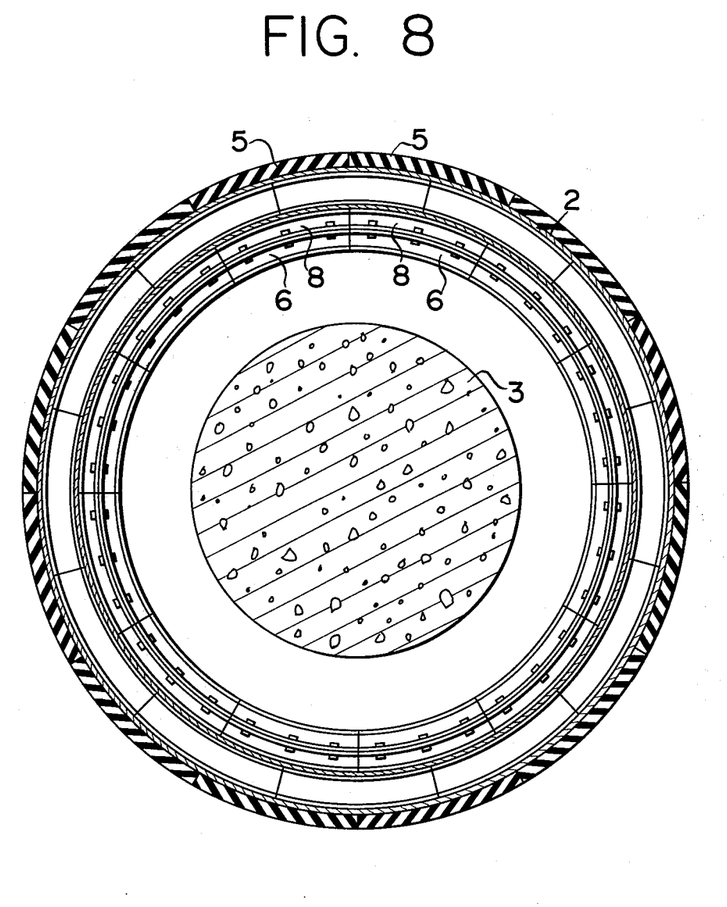
FIG. 8 is a cross sectional view of the same taken along line VIII—VIII of FIG. 6.

FIGS. 6 to 8 show the second embodiment of the present invention wherein part of the protecting cylinder 2 forms a double wall structure which includes float chambers 1. The arrangement of this embodiment is the same as the first embodiment except that the inner end of each of the elastic connecting members or rods 4 is connected to an anchoring member 13 embedded in or secured to the bridge pillar 3 so as to pivot in every direction, and the outer end thereof is connected to the inner wall of the double-wall structure so that it may be pivoted in every direction.

Figure 9:
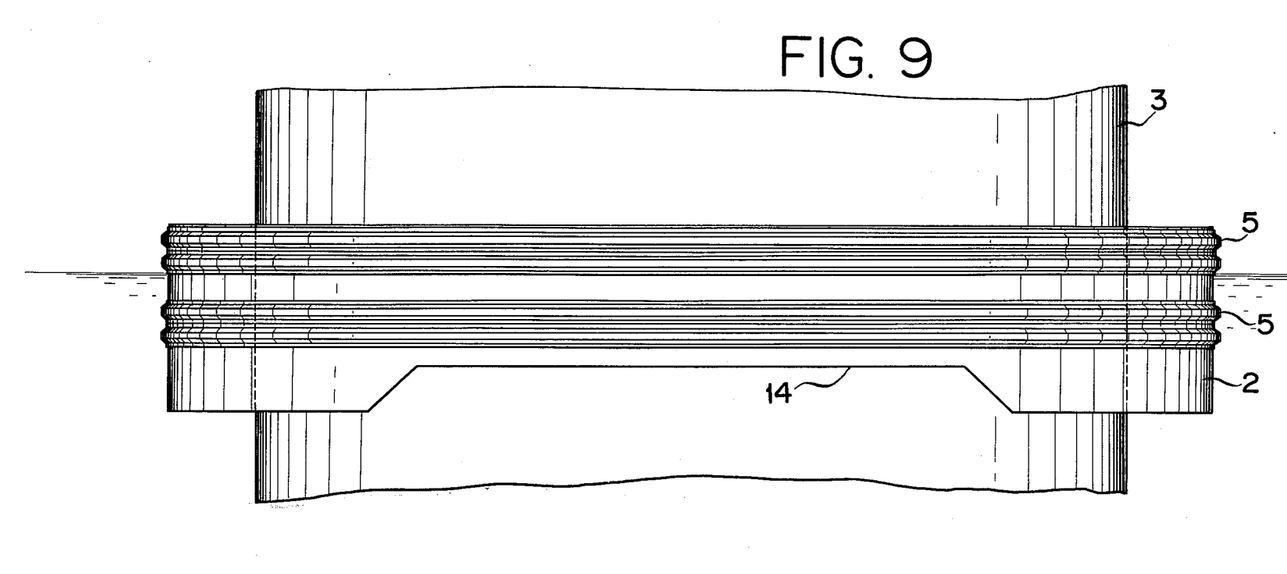
FIG. 9 is a side view of still another embodiment of the present invention.
Figure 10:
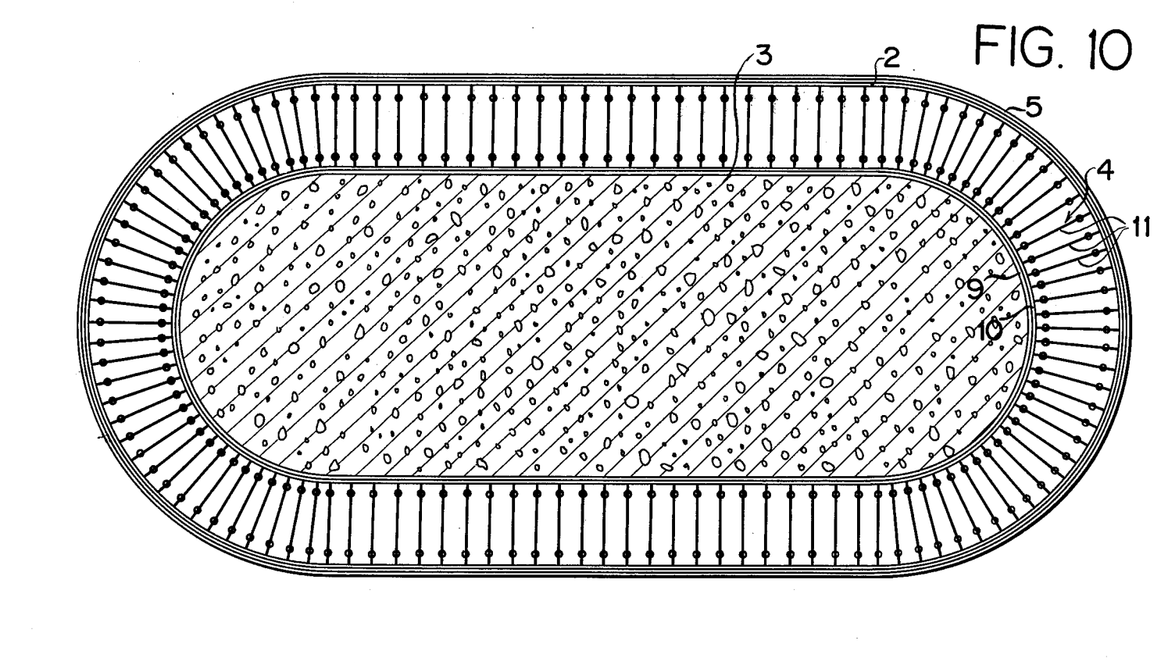
FIG. 10 is a cross sectional plan view of the device of FIG. 9.

FIGS. 9 and 10 show the third embodiment of the present invention which is the same in arrangement as the first embodiment except that the bridge pillar 3 and the protecting cylinder 2 are formed in an elongated oval shape and notches or recesses 4 are formed underneath long sides of the protecting cylinder 2.

Figure 11:
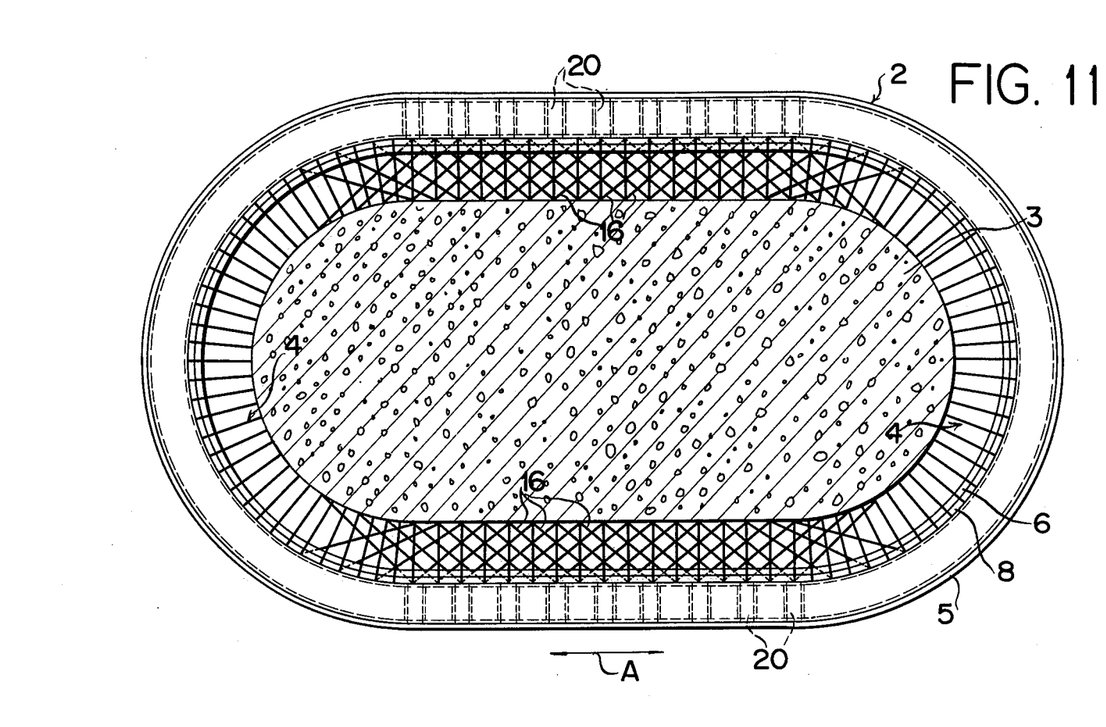
FIG. 11 is similar to FIG. 10 but showing still another embodiment of the present invention.
Figure 12:
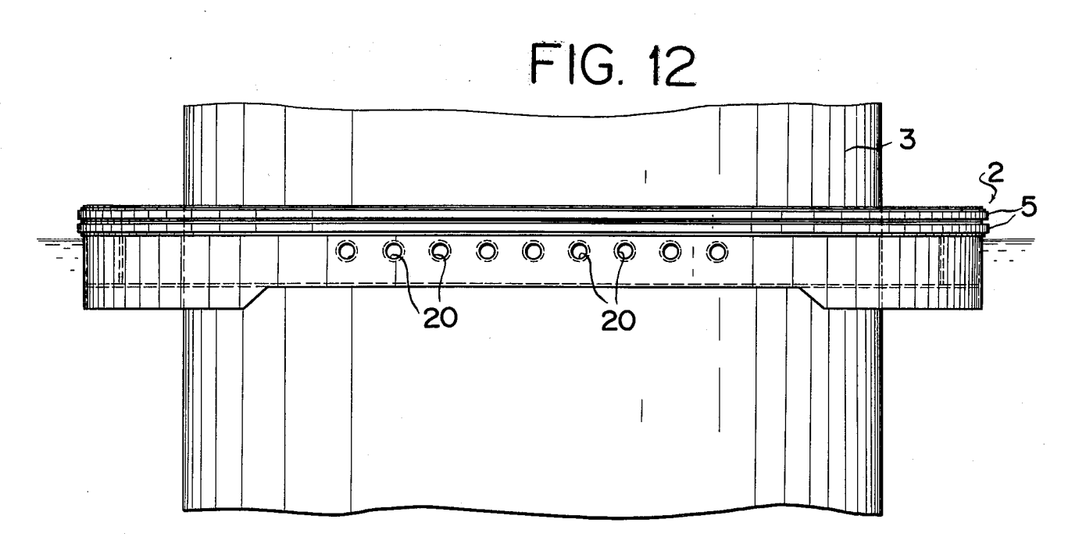
FIG. 12 is a side view of the embodiment shown in FIG. 11.
Figure 13:
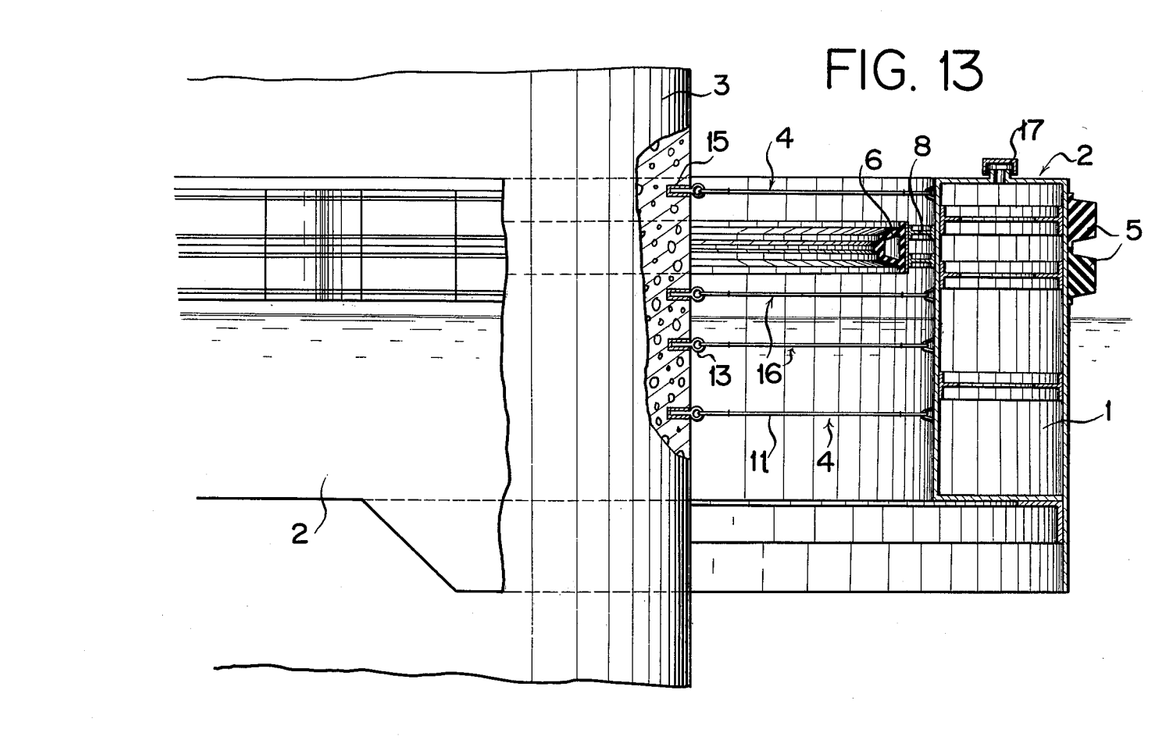
FIG. 13 is similar to FIG. 1 but showing longitudinal sectional elevation of the embodiment shown in FIG. 11.

FIG. 11, 12 and 13 show the fourth embodiment of the present invention which comprises a protecting cylinder 2 of non-circular or elongated oval cross section having its long sides extending in the direction "A" of passage of vessels, said protecting cylinder 2 being adapted to be located in spaced apart relationship from the outer peripheral surface of a submerged structure or bridge pillar 3 at a predetermined distance so as to surround the latter. The lower part of the protecting cylinder 2 is submerged in the sea water, and the upper part thereof is exposed above the surface of the sea. The outer cushion pads 5 and the inner cushion pads 6 are located above the sea level.

The protecting cylinder 2 has in the longitudinal direction in parallel with the direction of passage of vessels shown by "A" a plurality of water supply pipes 20 secured thereto. A plurality of elastic connecting members or rods 4 each having an intermediate elastic member 11 made of rubber or consisting of a helical spring are located around and in spaced apart relationship with the outer peripheral surface of a submerged structure 3. The elastic connecting rods 4 extend radially around the outer peripheral surface of the submerged structure 3 at right angles to the latter. The outer end of each of the elastic connecting rods 4 is connected to the protecting cylinder 2 so as to pivot freely in every direction, whilst the inner end thereof is connected to an anchoring metal fitting 13 secured by screwing-in to an anchor member 15 embedded in or secured to the structure 3 immersed in the sea water so that the inner end may be pivoted freely in every direction.

Located between the sections of the protecting cylinder 2 and the submerged structure 3 extending in parallel with the directions of passage of vessels shown by "A" are a plurality of elastic connecting members or rods 16 each having an intermediate elastic member 11 and extending in horizontal plane and obliquely to the directions "A" of passage of vessels. Stating more specifically, the elastic connecting rods 16 extend as particularly shown in FIG. 11 forwardly and backwardly in slant relative to the submerged structure 3. Further, the outer and inner ends of each of the obliquely extending elastic connecting rods 16 are connected to the protecting cylinder 2 and the submerged or immersed structure 3 so that they may be pivoted freely in every direction as in the case of the above-mentioned elastic connecting rods 4.

Reference numeral 17 denotes an air tight hollow chamber which serves to adjust the height of the protecting cylinder 2 above the sea level in cooperation with the float chambers 1. The volume of this hollow chamber 17 is determined based on the weight of the protecting cylinder 2 and the specific gravity of the sea water.

When this embodiment is put into practice, if the vessel passes through the bridge in one of the directions of passage of vessels shown by "A" or from behind to the front, the inclined elastic connecting rods which extend forwardly in slant relative to the submerged structure 3 may be omitted. Further, this embodiment is also applicable to the case where the protecting cylinder 2 is of a rectangular cross section, and the submerged structure 3 has approximately rectangular cross section.

According to this embodiment, the sections of the protecting cylinder 2 and the submerged structure 3 extending in approximately parallel with the directions of passage of vessels shown by "A" are interconnected by the obliquely extending elastic connecting rods 16 which can provide tensile elastic resistance. Therefore, should a vessel collide with the non-circular sections of the protecting cylinder extending in parallel with the directions of passage of vessels shown by "A", not only a braking force can be effectively applied to the ship by utilizing the elastic resistances afforded by the plurality of obliquely extending elastic connecting members or rods 16, but also collision of the protecting cylinder 2 against the submerged structure 3 with an excessive energy can be prevented.

Since various changes and modifications of the invention will occur to and can be made readily by those skilled in the art without departing from the concept of the invention, the invention is not to be taken as limited except by the scope of the appended claims.

What is claimed is:

1. An apparatus for protecting a bridge pillar comprising a protecting cylinder adapted to be mounted outside of said bridge pillar so as to surround the latter;
   a plurality of circumferentially spaced elastic connecting rods for interconnecting said bridge pillar and said protecting cylinder, said connecting rods being connected to said bridge pillar as well as to said protecting cylinder so that they may be pivoted in every direction and being extended at right angles to said bridge pillar and said protecting cylinder;
   an outer cushion pad adhered to the outside of said protecting cylinder;
   an inner cushion pad adhered to the inside of said protecting cylinder; and
   means for floating said protecting cylinder in water in such a manner that at least half of said protecting cylinder is immersed in water.

2. The apparatus for protecting a bridge pillar of claim 1 wherein said inside cushion pad is hollow.

3. The apparatus for protecting a bridge pillar of claim 2 wherein said cushion pads are made of rubber.

4. The apparatus for protecting a bridge pillar of claim 3 wherein said floating means comprises pipes fixedly secured to the inside wall of said protecting cylinder.

5. The apparatus for protecting a bridge pillar of claim 4 wherein said floating means is a chamber formed inside said protecting cylinder by making it double-wall structure.

6. The apparatus for protecting a bridge pillar of claim 5 wherein said bridge pillar and said protecting cylinder have an elongated oval like shape in cross section having parallel sides.

7. The apparatus for protecting a bridge pillars of claim 6 wherein a plurality of auxiliary connecting rods are provided obliquely between said bridge pillar and said protecting cylinder for interconnecting both at the parallel sides thereof.

8. The apparatus for protecting a bridge pillar of claim 7 wherein a plurality of holes are formed at the side wall of said protecting cylinder for permitting communication of the inside and outside thereof.

* * * * *